(12) United States Patent
Werner

(10) Patent No.: US 10,149,362 B2
(45) Date of Patent: Dec. 4, 2018

(54) SOLID STATE LIGHTING CONTROL WITH DIMMER INTERFACE TO CONTROL BRIGHTNESS

(71) Applicant: Power Integrations, Inc., San Jose, CA (US)

(72) Inventor: Antonius Jacobus Johannes Werner, Cambridge (GB)

(73) Assignee: Power Integrations, Inc., San Jose, CA (US)

( * ) Notice: Subject to any disclaimer, the term of this patent is extended or adjusted under 35 U.S.C. 154(b) by 431 days.

(21) Appl. No.: 14/340,223

(22) Filed: Jul. 24, 2014

(65) Prior Publication Data

US 2015/0035450 A1 Feb. 5, 2015

Related U.S. Application Data

(60) Provisional application No. 61/861,047, filed on Aug. 1, 2013.

(51) Int. Cl.
*G05F 1/00* (2006.01)
*H05B 37/02* (2006.01)
(Continued)

(52) U.S. Cl.
CPC ..... *H05B 33/0851* (2013.01); *H05B 33/0815* (2013.01); *H02M 3/156* (2013.01);
(Continued)

(58) Field of Classification Search
CPC ............ H05B 33/0815; H05B 33/0818; H05B 33/0845; H05B 33/0851; H05B 37/02;
(Continued)

(56) References Cited

U.S. PATENT DOCUMENTS

| 5,559,395 A | 9/1996 | Venkitasubrahmanian |
| 6,043,611 A | 3/2000 | Gradzki et al. |

(Continued)

FOREIGN PATENT DOCUMENTS

| CN | 101832490 A | 9/2010 |
| CN | 102625517 A | 8/2012 |
| CN | 103716934 A | 4/2014 |

OTHER PUBLICATIONS

Rand, D., et al., "Issues, Models and Solutions for Triac-Moduated Phase Dimming of LED Lamps", *IEEE Power Electronics Specialists Conference*, (PESC), (2007), 1398-1404.

(Continued)

*Primary Examiner* — Alexander H Taningco
*Assistant Examiner* — Christian L Garcia
(74) *Attorney, Agent, or Firm* — Christensen O'Connor; Johnson Kindness PLLC

(57) ABSTRACT

A dimmer interface circuit for reducing ringing on a drive signal to a lighting device. The dimmer interface circuit controls brightness of the lighting device and receives a brightness control voltage from a dimmer circuit. The dimmer interface includes a voltage converter and a charge store, which is coupled to receive charge from an inductive component to convert the brightness control voltage to the converter output voltage. The dimmer interface circuit also includes control circuitry to control the voltage converter such that a difference between the brightness control voltage and the converter output voltage at a time of transition of the brightness control voltage is closer to a target voltage difference.

21 Claims, 9 Drawing Sheets

(51) Int. Cl.
*H05B 39/04* (2006.01)
*H05B 41/36* (2006.01)
*H05B 33/08* (2006.01)
*H02M 3/156* (2006.01)

(52) U.S. Cl.
CPC ...... *H05B 33/0818* (2013.01); *H05B 33/0845* (2013.01); *H05B 37/02* (2013.01); *Y02B 20/346* (2013.01); *Y02B 20/347* (2013.01); *Y10S 362/80* (2013.01)

(58) Field of Classification Search
CPC ... Y02B 20/346; Y02B 20/347; Y10S 362/80; H02M 3/156; H02M 1/4225
USPC ... 315/291, 307, 224, 209 R, 312, 247, 297; 323/905; 362/800, 227
See application file for complete search history.

(56) References Cited

U.S. PATENT DOCUMENTS

| | | | |
|---|---|---|---|
| 7,567,445 B2 | 7/2009 | Coulson et al. | |
| 7,944,722 B2 | 5/2011 | Coulson et al. | |
| 8,446,746 B2 | 5/2013 | Coulson et al. | |
| 2007/0261463 A1 | 11/2007 | Minakawa et al. | |
| 2011/0254525 A1* | 10/2011 | Gaknoki | H05B 33/0815 323/283 |
| 2011/0285301 A1* | 11/2011 | Kuang | H05B 33/0845 315/200 R |
| 2012/0286826 A1* | 11/2012 | King | H05B 33/0815 327/79 |
| 2014/0265893 A1* | 9/2014 | Melanson | H05B 33/0806 315/192 |
| 2014/0320031 A1* | 10/2014 | Wu | H05B 33/0812 315/193 |

OTHER PUBLICATIONS

PRC (China) Patent Application No. 201410376971.6—First Office Action and English Translation dated Oct. 10, 2017, 14 pages.
PRC (China) Patent Application No. 201410376971.6—Second Office Action and English Translation dated May 18, 2018, 5 pages.
PRC (China) Patent Application No. 201410376971.6—Third Office Action and English Translation dated Aug. 22, 2018, 5 pages.

* cited by examiner

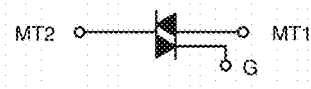
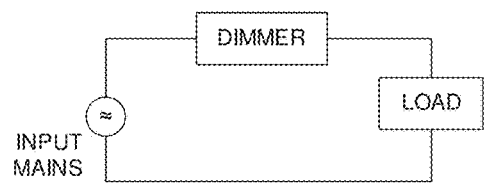
Fig. 1a        Fig. 1b
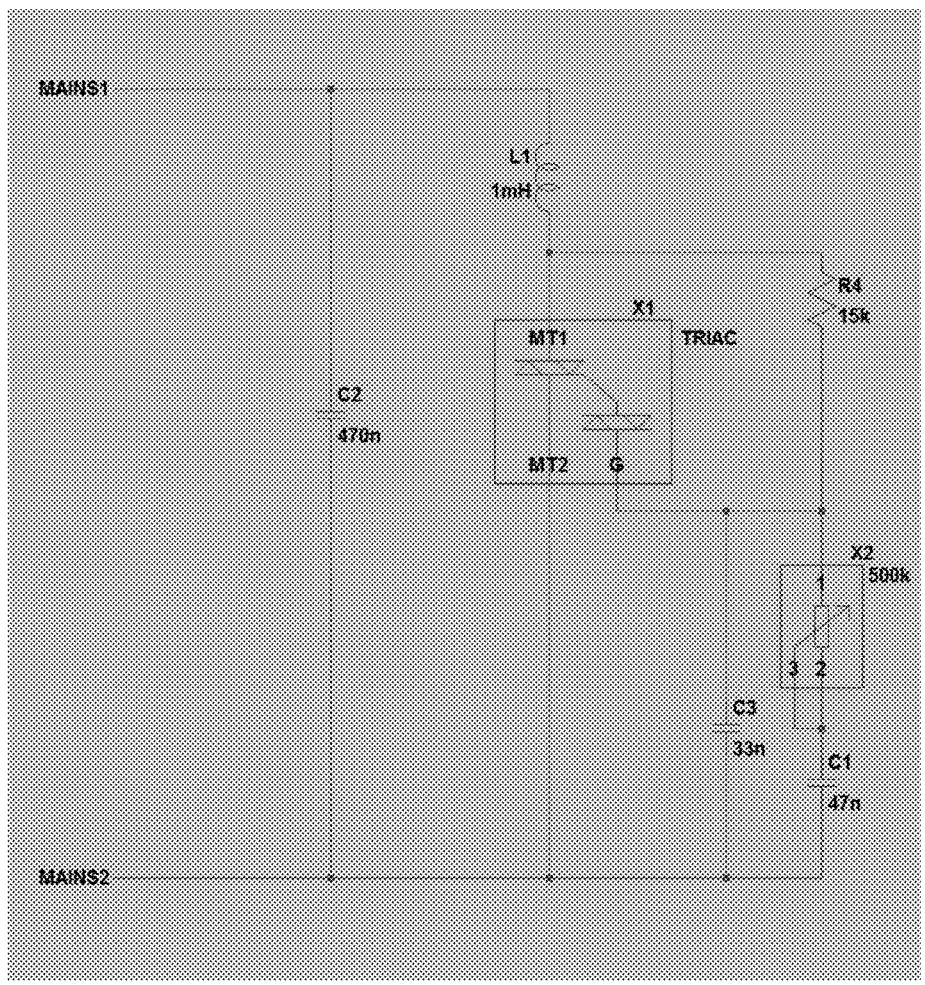
Fig. 1c

SOLID STATE LIGHTING CONTROL WITH DIMMER INTERFACE TO CONTROL BRIGHTNESS

RELATED APPLICATIONS

This application claims priority under 35 U.S.C. 119(e) to U.S. Provisional Application No. 61/861,047, filed Aug. 1, 2013; which application is incorporated herein by reference in its entirety.

FIELD OF THE INVENTION

This invention generally relates to solid state lighting control, and more particularly to a dimmer interface circuit, solid state lighting device drivers and a method for reducing ringing on a drive signal to a solid state lighting device.

BACKGROUND TO THE INVENTION

There is high demand for good quality LED lamps to replace incandescent light bulbs. However, while their energy efficiency is widely-touted, current LED lamps suffer from a number of disadvantages in which the driver electronics may play a part:
  poor light quality—while LED selection and optical design are very relevant in this regard, the driver electronics impose limitations on (i) visible flicker, (ii) invisible flicker, and/or (iii) dimming performance. In general, light quality is frequently considered to be inferior to that of incandescent bulbs, in particular when using typical AC dimmer controls;
  high cost—a good quality replacement LED lamp costs in the region of £20, a clear disincentive to consumers. Although the LED chip and optical and mechanical parts form the major part of the bill of materials, the electronics are presently too expensive;
  disappointing lifetime—the main argument used in justifying the high asking price of LED lamps is that they last many times as long as incandescent lamps. This originates in the long lifetimes of LED chips themselves, however some of the driver electronics parts tend to have shorter lifetimes than the LEDs. In particular, very long lifetime electrolytic capacitors—especially those rated to high voltages (~450 V)—are either unavailable or are very expensive; and/or
  poor power factor—concerns over power quality have prompted the adoption of regulations for minimum power factor for LED lamps, e.g. EC 1194/2012. This effectively prevents the use of driver circuits that store considerable energy in large, high voltage capacitors on their primary (input) side, as used in many power supplies and chargers having poor power factor.

Many of these same disadvantages have been previously encountered in the development of fluorescent lamps, in particular that of dimmable compact fluorescent lamps (CFLs). However, due to the differing drive requirements of LEDs and fluorescent tubes, some remain to be overcome.

Regarding LED lamp performance when used with AC dimmers, it is noted that most existing dimmer controls were designed for incandescent lamps. LED lamps present a very different load to the dimmer circuit from that presented by incandescent lamps. Of particular note are the most widespread dimmer types, which employ leading edge phase modulation by triac-based circuits. In this regard, the following phenomena are of note when LED lamps are combined with phase modulating dimmers: visible pulsing of LEDs, audible noise from LED light bulbs, LEDs never fully turn on, LEDs turn on when the dimmer is turned off, and/or substantial inrush current when a triac turns on, potentially damaging both the triac and LED drivers.

Thus, there remains a need for improvements in solid state driver circuits and, in particular, LED driving, in relation to, inter alia, light quality, cost, power factor and/or lifetime, etc., for example with specific regard to ringing.

For use in understanding the present invention, the following disclosures are referred to:
  R and et al, Issues, Models and Solutions for Triac-Modulated Phase Dimming of LED Lamps Power Electronics Specialists Conference (PESC) 2007;
  U.S. Pat. No. 6,043,611 (Philips);
  U.S. Pat. No. 5,559,395 (Philips);
  U.S. patent application Ser. No. 11/445,473, issued as U.S. Pat. No. 7,567,445;
  U.S. patent application Ser. No. 12/405,618, issued as U.S. Pat. No. 7,944,722; and
  U.S. patent application Ser. No. 12/752,611, issued as U.S. Pat. No. 8,446,746.

SUMMARY

According to a first aspect of the present invention, there is provided a dimmer interface circuit for controlling brightness of a solid state light emission device, the interface circuit having an input to receive a brightness control voltage from a dimmer circuit and comprising: a voltage converter to provide a converter output voltage and having an inductive component and a charge store, the charge store controllably coupled to receive charge from the inductive component to thereby convert the brightness control voltage to the converter output voltage; and control circuitry comprising: an input to receive a voltage level indication of the brightness control voltage; an input to receive a voltage level indication of the converter output voltage; a comparison circuit to compare a said received brightness control voltage level indication and a said received converter output voltage level indication; and a transition detector to detect a transition of the brightness control voltage, said transition for turning a said solid state light emission device on, wherein the control circuitry is configured to control the voltage converter dependent on a said comparison of said level indications received at a time of a said transition in a first cycle of the brightness control voltage, such that a difference between the brightness control voltage and the converter output voltage at a time of a said transition in a second, later said cycle is closer to a target voltage difference than a said difference at the time of the transition in the first cycle.

Advantageously, when a load on the dimmer interface circuit comprises a switched mode power supply (SMPS) driving the solid state light emission device (e.g., LED such as OLED), ringing due to resonance of reactive components of the SMPS and/or reactive components of the dimmer when a transition in brightness control voltage occurs may be reduced or prevented by such control to approach the target difference, this effectively clamping/regulating the converter output voltage in an embodiment. This may reduce or prevent unwanted turn offs of a triac of such dimmer. LED control may thus be improved, e.g., resulting in reduced flicker and/or longer lifetime of the SMPS and/or LED.

Such control to approach the target difference may involve, e.g., increasing a stored timer input parameter when it is determined that a difference between the brightness control voltage and converter output voltage is greater than target difference and/or decreasing the stored timer input parameter when it is determined that a difference between the brightness control voltage and converter output voltage is less than the target difference. The stored parameter may then be used to control a degree of voltage boost of the converter output voltage relative to the input brightness control voltage after the next such transition, the stored parameter preferably determining how long boost converter switching occurs after the transition.

The brightness control voltage (this which also be referred to as the (input) mains in the detailed description) is preferably clamped to the charge store (Cboost). In an embodiment, there may further be provided the dimmer interface circuit, comprising voltage clamp circuitry (e.g., e.g. diode Dsurge) to clamp the brightness control voltage to the converter output voltage and to conduct to the charge store current received from the input to receive the brightness control voltage. Such clamping may enhance damping of ringing that may occur due to resonance of dimmer and/or SMPS components as mentioned above.

There may further be provided the dimmer interface circuit, wherein the comparison circuit is configured to perform a said comparison to indicate a difference between the level indications received at the time of the transition in the first cycle, and the control circuitry is configured to perform the converter control dependent on the indicated difference.

There may further be provided the dimmer interface circuit, the control circuitry configured to control an amount of charge delivered to the charge store from the inductive component during a said cycle of the brightness control voltage, to thereby perform said converter output voltage control. This may be achieved by adjusting how long the converter operates to boost the output voltage, e.g., how long a converter switch Qboost operates. A stored timer parameter may be adjusted dependent on a measured said difference at each said transition, in order to allow the timer to control the duration of such switching. There may further be provided the dimmer interface circuit, comprising a switch to provide said controllable coupling, the control circuitry configured to control at least one switching cycle (on-off or vice versa) of the switch to thereby control the amount of charge, the control comprising for example determining the number of switching cycle(s) that allow delivery of the charge to the charge store, and/or frequency or duty cycle of such switching cycle(s) or any combination of these. The controllable coupling may comprise a switch (e.g., Qboost) the open/closed state of which may determine whether or not current flows onto the charge store (e.g. Cboost).

There may further be provided the dimmer interface circuit wherein the control circuit is configured to control a plurality of switching cycles of the switch to control an average current received by the charge store from the inductive component, to thereby control said amount of charge. This may be achieved by pulse-width modulation (PWM) and/or pulse frequency modulation (PFM) of switching of the converter. Control of current drawn by the triac may be allow more reliable triac latch and/or hold and thus for example reduce flicker. Control of average current may be performed, for example to provide a substantially (e.g., exactly) constant current during the provision of the amount of charge and/or to provide a predetermined profile of average current during such charge provision. There may further be provided the dimmer interface circuit, the transition detector configured to trigger the charge delivery to the charge store.

There may further be provided the dimmer interface circuit, configured to control a duration of the charge delivery, to thereby perform the controlling the amount of charge. As indicated above, such a duration may be controlled by a timer (timing circuit) based on a stored timer input parameter.

There may further be provided the dimmer interface circuit, comprising a timing circuit configured to end the charge delivery when the duration elapses, the timing circuit configured to indicate a zero crossing of a mains voltage based on the brightness control voltage and to time the duration from said zero crossing indication.

There may further be provided the dimmer interface circuit, configured to control the charge delivery such that a said duration of the charge delivery extends through a peak of the brightness control voltage. ('mains' generally referring to a general-purpose AC electric power supply, otherwise known for example in the US as, e.g., household power/electricity or grid power). A digital or analogue peak detector may be used to implement this. Such control may be advantageous when the interface circuit is designed to detect a mains zero-crossing on the brightness control input. The position of the zero crossing may be used for the timing circuit.

There may further be provided the dimmer interface circuit, configured to deliver a first average current followed a second lower average current to the charge store to thereby deliver the amount of charge. The higher first current may allow to maintain the triac on, e.g., to latch and/or hold the triac. Such a current profile may allow more reliable triac latch and/or hold and thus for example reduce flicker.

There may further be provided the dimmer interface circuit, configured to control a peak voltage of the converter output voltage to thereby perform said converter output voltage control. Controlling the value of this peak voltage, for example using a digital or analogue peak detector, may serve to ensure that the desired target voltage difference is achieved at the following brightness control voltage transition. Thus improvements in reliability and/or flicker may be achieved.

There may further be provided the dimmer interface circuit, wherein the charge store comprises a non-electrolytic capacitor. This may allow, e.g., cost reduction.

There may further be provided the dimmer interface circuit, comprising a voltage indicator circuit to indicate a value of a mains voltage at a said transition, the control circuitry configured to control the target voltage difference based on the indicated value of the mains voltage.

A solid state lighting device driver comprising a dimmer circuit and a dimmer interface circuit may be provided, the dimmer circuit comprising a triac and operable to control a phase angle of switching of the triac to thereby control the brightness control voltage.

The solid state lighting device driver may comprise a dimmer interface circuit of any preceding claim and an output stage for driving a solid state light emission device, the dimmer interface circuit coupled to provide the converter output voltage to the output stage, the output stage having a power controller configured to reduce a power consumption of the output stage in response to the converter output voltage falling below a threshold voltage. In an embodiment this may be restricted to when the brightness control voltage indicates very large dimming angle, e.g., above 160 or 170 degrees.

The solid state lighting device driver may comprise a dimmer interface circuit of any preceding claim and an output stage for driving a solid state light emission device, the dimmer interface circuit coupled to provide the converter output voltage to the output stage, the output stage configured to shunt charge from the charge store dependent on a dimming angle indicated by the brightness control voltage, the shunting to reduce the converter output voltage. In an embodiment this may be restricted to when the brightness control voltage indicates very small or very large dimming angle, e.g., less than 10 or 20 deg or above 160 or 170 degrees.

According to a second aspect of the present invention, there is provided a method for reducing ringing on a drive signal to a solid state lighting device, the method comprising: controlling a phase angle of switching of a triac of an AC dimmer circuit to thereby provide a brightness control signal for determining brightness of the lighting device; detecting a transition of the brightness control voltage in a first cycle of the brightness control signal, said transition for turning a said solid state light emission device on; comparing a level of the brightness control signal and a level of the output voltage of the converter, the brightness control and output control voltages having the levels at a time of a said detected transition; regulating a boost converter output voltage such that a difference between the brightness control and output control voltages at the time of a said transition occurring during a later cycle of the brightness control signal is closer to to a target voltage difference than a said difference detected in a earlier cycle comprising the detected transition; using the converter output signal to drive the lighting device.

There may further be provided the method, comprising determining the target voltage difference on the basis of at least one of: an indication of a mains voltage at the time of a said detected transition; a capacitance value of the charge store; a rated power of an LED driver coupled to an output of the boost converter.

The target voltage difference may be between 30V and 80V, preferably at least 50V.

According to a further, there is provided a dimmer interface circuit for controlling brightness of a solid state light emission device, the interface circuit having an input to receive a brightness control voltage from a dimmer circuit and comprising: a voltage converter to provide a converter output voltage and having an inductive component and a charge store, the charge store controllably coupled to receive charge from the inductive component to thereby convert the brightness control voltage to the converter output voltage; and control circuitry comprising: an input to receive a voltage level indication of the brightness control voltage; an input to receive a voltage level indication of the converter output voltage; a comparison circuit to compare a said received brightness control voltage level indication and a said received converter output voltage level indication; and a transition detector to detect a transition of the brightness control voltage, said transition for turning a said solid state light emission device on, wherein the control circuitry is configured to control the voltage converter dependent on a said comparison of said level indications received at a time of a said transition in a first cycle of the brightness control voltage, to provide a difference between the brightness control voltage and the converter output voltage at a time of a said transition in a second, later said cycle within a target voltage difference range.

Such an embodiment may be combined with any one or more of the optional features of the first aspect, and may similarly result in reduced flicker and/or longer lifetime of the SMPS and/or LED.

In an embodiment control to preferably ensure that the difference at the next transition is closer to and/or within the predetermined range (e.g., the converter output voltage being less than a first predetermined voltage difference below the brightness control voltage at the next transition and/or voltage being less than a first predetermined voltage difference above the brightness control voltage at the next transition) may involve, e.g., increasing a stored timer input parameter depending on a measured difference between the brightness control voltage and converter output voltage. The stored parameter may then be used to control a degree of voltage boost of the converter output voltage relative to the input brightness control voltage after the next such transition, the stored parameter preferably determining how long boost converter switching occurs after the transition.

Preferred embodiments are defined in any appended dependent claims.

Any one or more of the above aspects and/or any one or more of the above optional features of the preferred embodiments may be combined, in any permutation.

BRIEF DESCRIPTION OF THE DRAWINGS

For a better understanding of the invention and to show how the same may be carried into effect, reference will now be made, by way of example, to the accompanying drawings, in which:

FIG. 1 shows (a) a schematic diagram of a triac; (b) connection of a two-terminal triac dimmer to input mains and a load (preferably comprising a solid state light emission device); (c) circuit schematic of a typical triac dimmer;

DETAILED DESCRIPTION OF PREFERRED EMBODIMENTS

Generally, an embodiment provides a dimmer interface for an LED driver. A preferred embodiment provides advantages relating to LED lamp performance when used with AC dimmers. Advantages of an embodiment may for example relate to quality of light from an LED lamp—particularly when controlled by AC dimmers—and/or high electronic parts cost.

An embodiment provides control of boost output voltage to be below the instantaneous mains input voltage when the dimmer triac fires, by a target voltage difference. This may for example be achieved by controlling boost converter switching (for example by employing current shaping for optimal triac latch/hold), and/or by controlling output stage switching/power consumption. Additionally or alternatively, an embodiment provides an LED driver controller in a preferably 8-pin package, which senses $V_{IN}$ at a pin connected to a boost converter switch control terminal and senses +HT at a pin sensing input voltage of the output stage.

Embodiments are generally based on a two stage power converter topology, preferably a boost-flyback converter. This may allow power factor correction (PFC) using the boost stage, and good output current and voltage control using the flyback stage. A boost converter may employ a relatively small high voltage capacitor to store energy, such that the expensive or short lifetime electrolytic parts can be avoided. This topology therefore provides advantages relating to power factor and/or lifetime.

Considering the dimmer, we note that a variety of AC dimmers are available. The two primary types are both referred to as 'phase-cut' or 'phase modulation' dimmers, which truncate each mains half cycle from the beginning ('leading edge') or from the end ('trailing edge'). The most widespread AC dimmers of all are low-cost leading edge types, typically employing a Triode for Alternating Current (triac). Illustrated in FIG. 1(a), a triac is a three-terminal device that is turned on by driving the gate G and drawing at least a minimum current—a 'latch current'—through main terminals MT1 and MT2. Typical latch current for a triac in a 600 W rated dimmer is below 100 mA. Once turned on ('latched') it cannot be turned off by controlling the gate. Rather, it will turn off only when the current through main terminals MT1 and MT2 drops below a 'hold current' (of c. 10-40 mA, depending on the particular triac).

Figure 2:
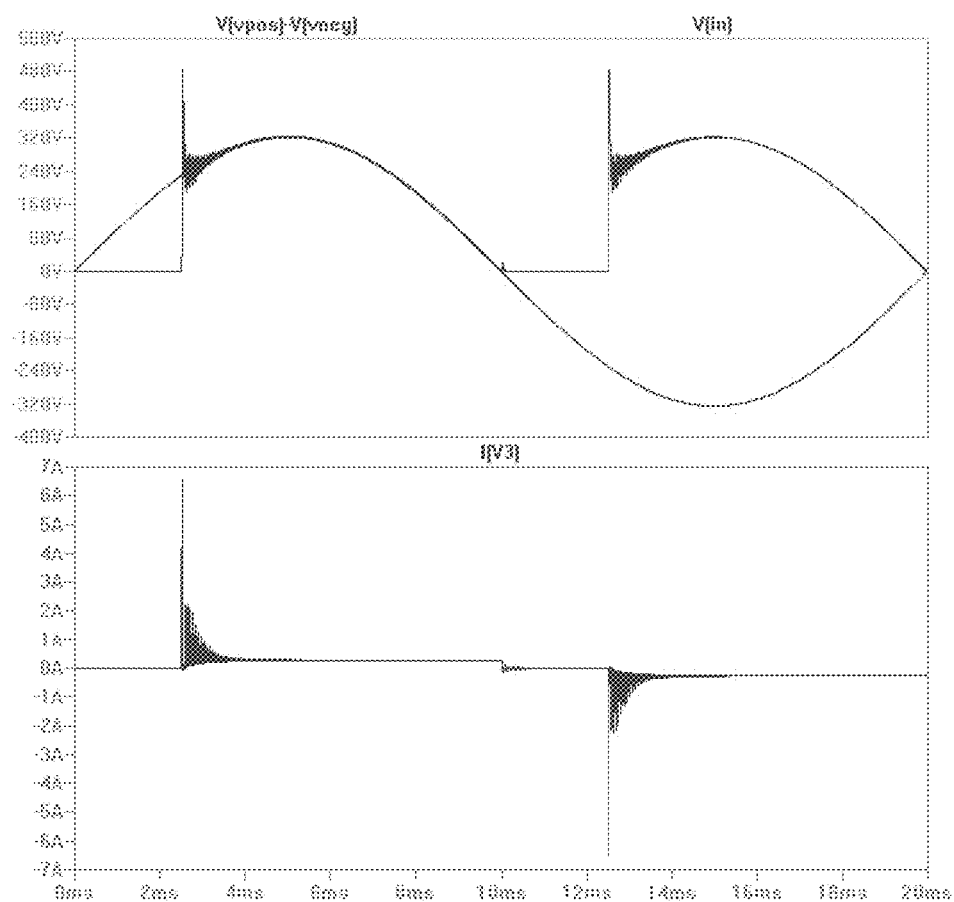
FIG. 2 shows input voltage and current waveforms for reactive SMPS dimmer load.

Most triac dimmers are two-terminal devices placed in series with the load, with no connection to the other mains line, as shown in FIG. 1(b). They are typically specified for 40-50 W minimum resistive load. Lower power loads will not properly latch/hold the triac in conduction. Furthermore, triac dimmers are designed for resistive loads; reactive components in an SMPS input filter can cause ringing and premature triac turn off. As shown in FIG. 1(c), the dimmer circuit contains reactive components: The inductor L1 limits the dI/dt at turn-on of the triac (which protects the triac). The capacitor C2 is put in for EMI purposes. The input stage of many typical SMPS circuits contains an input EMI filter. This input filter will resonate with the reactive components in the dimmer, potentially causing the triac current to ring down below the hold current and turning the triac off. This is illustrated in FIG. 2, showing the voltage across (upper blue trace), and current drawn by (lower blue trace), a reactive SMPS dimmer load over one mains cycle. Both voltage and current ring considerably after the triac fires, the current ringing down to very low levels.

Passive (i.e. resistive) damping of such ringing makes the dimmer's load—the SMPS—appear more like an incandescent lamp. A good dimming performance of a LED lamp employing a 200Ω series resistance in its input circuit to this end suggests that the approach works, however efficiency is significantly degraded, even when no dimmer is present. The dissipative loss in the series resistance increases as the LED lamp power increases.

A series RC snubber may be placed across the output of an LC input EMI filter to damp the ringing triggered by the triac firing. This approach may prevent the input current from ringing below the triac hold current and to reduce line frequency power dissipation of the filter. However a relatively large capacitor is required, and the high frequency energy is still dissipated and therefore adversely affects efficiency.

Figure 3:
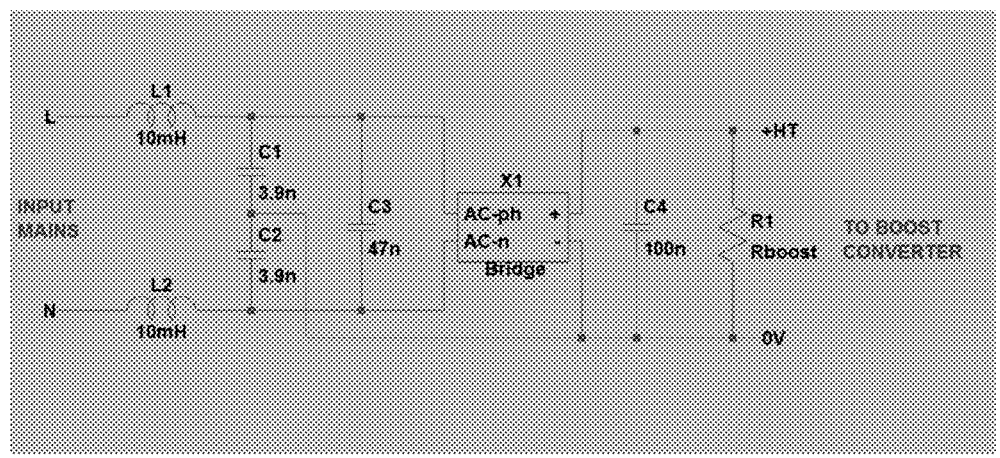
FIG. 3 shows a high impedance input filter.

The input filter of the SMPS may be so constructed as to present a resistive impedance to the dimmer. This approach is illustrated in FIG. 3. A minimum resistive loading of the network of 480Ω is required for the damping to work well, based on the components shown. This will require a high input current. The second disadvantage of this approach is that the input inductors are not allowed to saturate and should allow peak currents of more than 2 A. This requires physically large inductors L1 and L2 that are not compatible with cheap, small incandescent replacement LED lamps.

Figure 4:
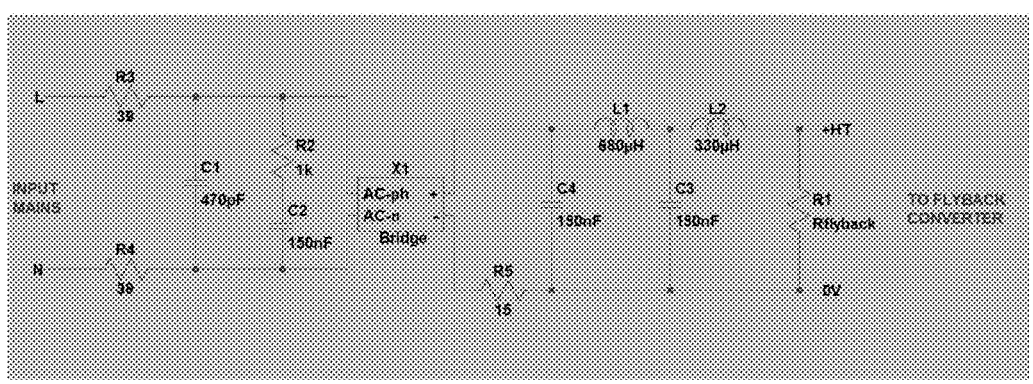
FIG. 4 shows a combination damping scheme using series resistances, an RC snubber and other filter components.

Combinations of the above techniques are possible, and other filters may be added to further change the load presented to the dimmer. The circuit shown in FIG. 4 combines a 78Ω (2×39Ω) series damping resistance with a snubber composed of C2 and R2, with further filtering components R5, L1, L2, C3 and C4. Design of such a multi-component network is far from straightforward and adds significantly to the electronic bill of materials.

In contrast, the design of an embodiment preferably centres on controlling the boost capacitor voltage to provide a clamp for ringing caused by triac firing events. It will be described in reference to FIG. 5.

Figure 5:
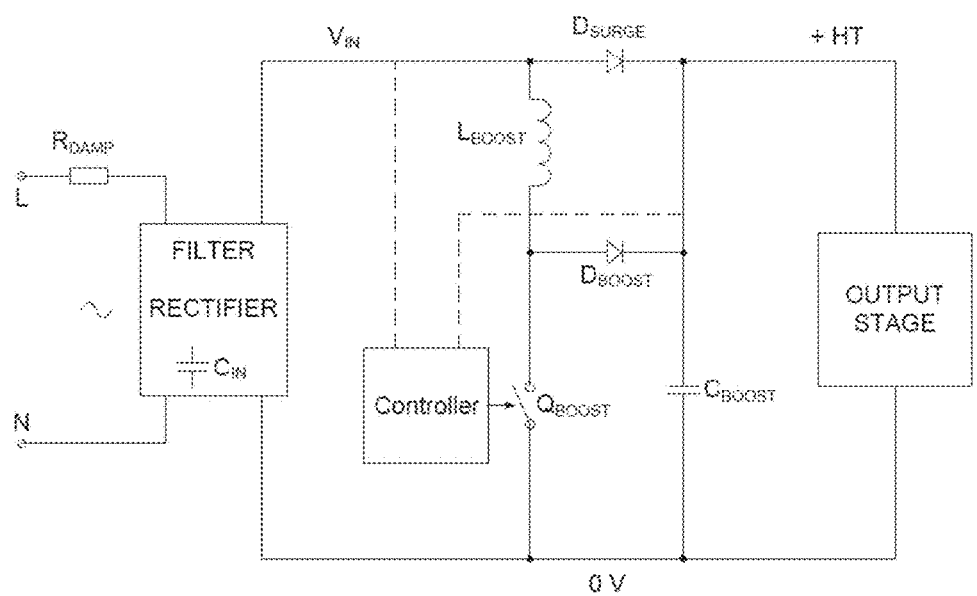
FIG. 5 shows a schematic illustration of an embodiment, preferably a dimmer interface circuit for interfacing to an output stage, the dimmer interface circuit comprising an input L to receive a brightness control voltage (e.g., mains input) passed on as VIN, control circuitry (block labelled controller), control a voltage converter comprising inductive component LBOOST, switch QBOOST, DBOOST and charge store CBOOST to provide converter output voltage +HT.

The embodiment illustrated in FIG. 5 may be considered as a load depicted in FIG. 1(b), receiving one input (L) from a triac dimmer and the other directly from the mains input (N). Alternatively the embodiment may form the load for other types of dimmer.

An input circuit of such an embodiment may comprise one or more of a filter and/or a rectifier and/or an input capacitor $C_{IN}$. Typically a filter(s) may act to limit electromagnetic interference (EMI) emissions, and may further act to improve some aspects of triac dimmer behaviour, as explained above. A rectifier typically serves to convert bi-directional input signals into unidirectional ones, and may be in the form of a bridge diode (full wave) rectifier. An input capacitor $C_{IN}$ may be connected across the mains input, either before, after or between the other components of the input circuit. $C_{IN}$ may alternatively form a part of the filter. The composition and arrangement of the input circuit components may be mainly determined by the required input filtering to meet the required EMI standards.

Inductor $L_{BOOST}$, switch $Q_{BOOST}$, which may represent a controllable coupling, diode $D_{BOOST}$ and capacitor $C_{BOOST}$ comprise a boost converter. A further diode $D_{SURGE}$ allows current to bypass $L_{BOOST}$ when the voltage at the input to the boost converter, $V_{IN}$, becomes greater than a diode drop higher than the voltage at the output of the boost converter, +HT. Thus, diode Dsurge may perform a clamping action of the input mains (ie. the brightness control information) to the voltage on the boost capacitor; this is desirable part of the damping approach. Dsurge may thus represent a voltage clamp circuit. Switch $Q_{BOOST}$ is controlled by a controller, which may comprise an integrated circuit (IC) and which may also control the output stage. The controller is able to directly or indirectly sense, or estimate, both the boost converter output voltage, +HT, and the boost converter input voltage, $V_{IN}$. This point is illustrated by the dashed lines in FIG. 5.

An output stage may comprise a further converter stage, such as a flyback converter or a buck converter. The output stage may drive one or more LEDs to provide a desired light output.

Preferred such embodiments may be summarized as follows: the boost converter is controlled such that when the triac in a leading edge dimmer to which it is coupled fires, the output voltage, +HT, is smaller than the instantaneous input voltage, $V_{IN}$, by a target voltage difference. This concept is illustrated in the waveforms of FIGS. 6(a) and 6(b).

Figure 6:
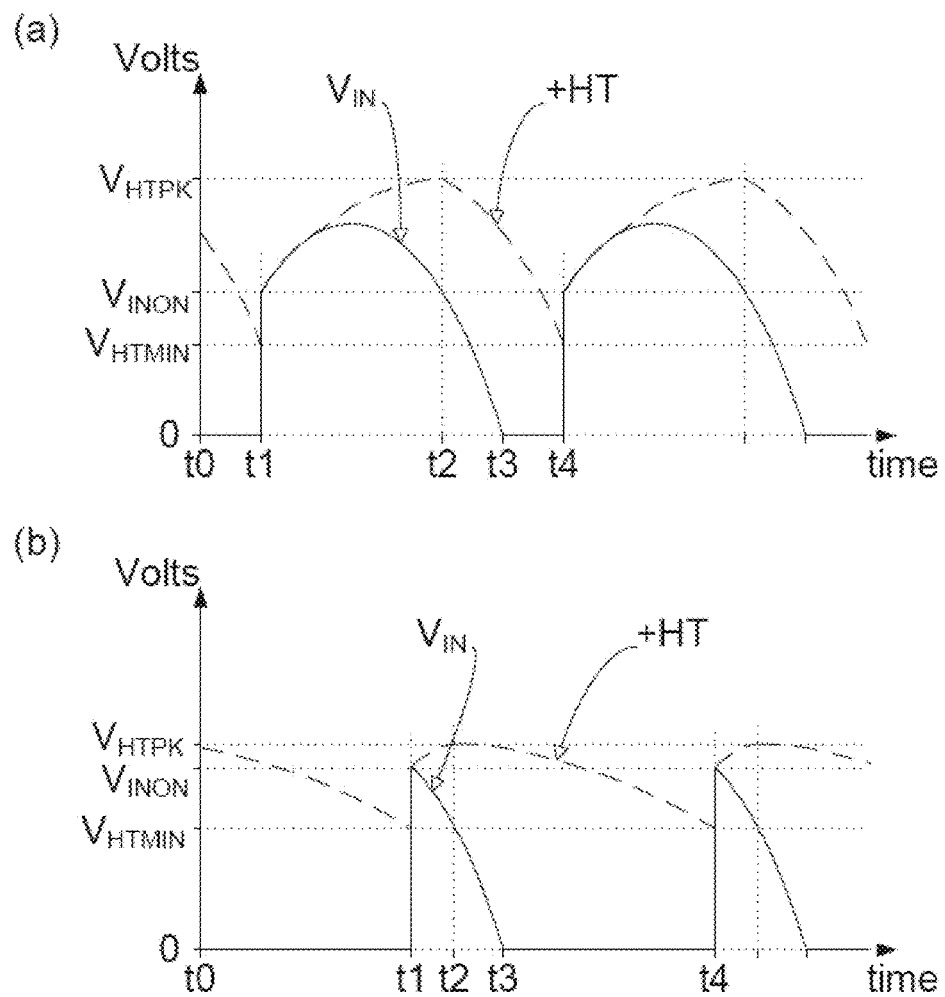
FIG. 6 shows (a) waveforms of an embodiment in which the triac dimmer is set to a relatively small dimming angle to provide a high brightness; and (b) waveforms of an embodiment in which the triac dimmer is set to a relatively large dimming angle to provide a low brightness.

The waveforms of FIGS. 6(a) and 6(b) illustrate $V_{IN}$ (solid line) and +HT (dashed line) when a coupled triac dimmer is set to two different dimming angles (phase angles; brightness settings). In FIG. 6(a) the triac dimmer is set to a relatively small dimming angle to provide a high brightness. In FIG. 6(b) the triac dimmer is set to a relatively large dimming angle to provide a low brightness. This is reflected in the time at which the triac fires, t1. At the smaller dimming angle of FIG. 6(a), t1 occurs shortly after a mains zero-crossing at t0. At the larger dimming angle of FIG. 6(b), t1 occurs shortly before a zero crossing at t3. In both cases the instantaneous input voltage and output voltage when the triac fires at time t1 are denoted $V_{INON}$ and $V_{HTMIN}$. Hence an embodiment advantageously controls voltage +HT such that at time t1 it is smaller than $V_{IN}$ by a target voltage difference ($V_{INON}-V_{HTMIN}$).

A means for controlling voltage +HT is the boost converter switch $Q_{BOOST}$. This switch may be operated during the interval t1 to t3 in one or more of the known switching modes, e.g. boundary mode, discontinuous mode, continuous mode, to charge the boost capacitor $C_{BOOST}$. Once $Q_{BOOST}$ switching ceases at time t2, voltage +HT decreases as charge is consumed from $C_{BOOST}$ by the output stage. The rate of this $C_{BOOST}$ charge consumption is typically constant for a static setting of the dimming angle as the output stage produces a constant light output. As is indicated in FIGS. 6(a) and 6(b) the output stage consumes $C_{BOOST}$ charge more rapidly at the smaller dimming angle (higher brightness), as the LED(s) require more current.

Figure 8:
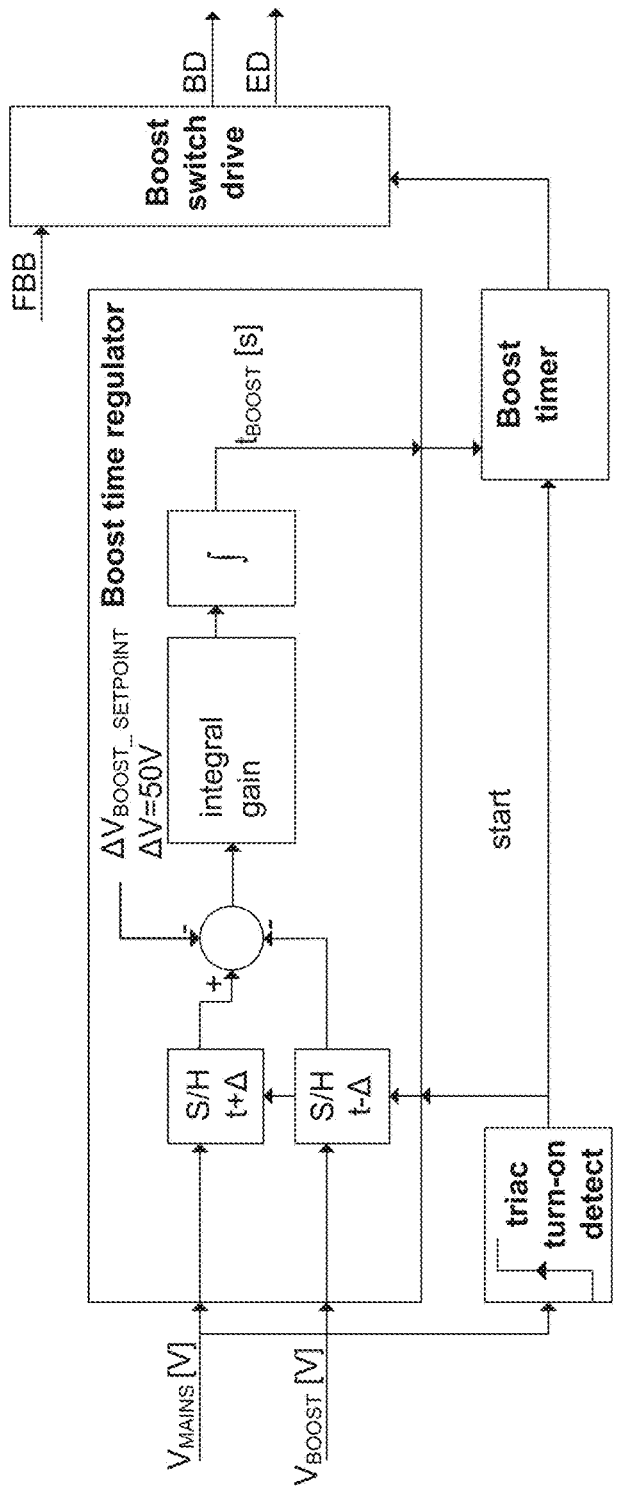
FIG. 8 shows an example implementation for control circuitry, for example for the controller of FIG. 5 or 7; and, the control circuitry having an input VMAINS[V] for receiving a voltage level indication of the brightness control voltage, input VBOOST[V] for receiving a voltage level indication of a converter output voltage, a comparison circuit feeding into an integral gain block, a transition detector (labelled triac turn-on detect), and/or a timing circuit (boost timer)
Figure 9:
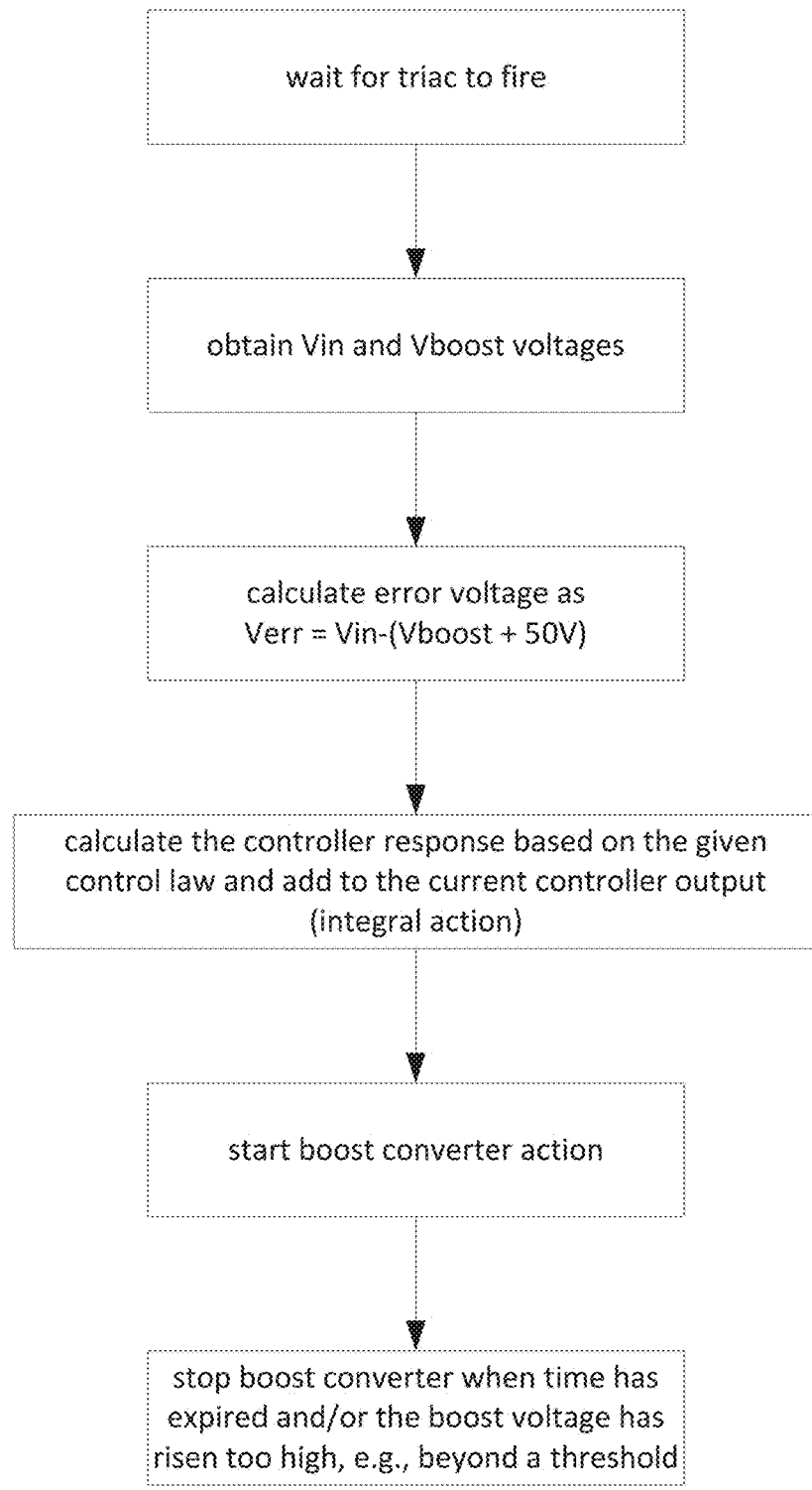
FIG. 9 shows an example flow diagram of steps performed by a controller such as the boost converter on-time regulator of FIG. 8.

The duration of $Q_{BOOST}$ switching, i.e. interval t1 to t2, may be controlled to ensure the desired target voltage difference ($V_{INON}-V_{HTMIN}$) when the triac fires in a subsequent mains half-cycle at time t4. During the t1 to t2 interval switching may be continual or in 'bursts' separated by period(s) of non-switching. For very large dimming angles it may not be necessary for the boost converter to switch at all, i.e. (t2−t1)→0, to ensure that voltage +HT falls sufficiently low by time t4. A constraint on the time t2, i.e. the cessation of $Q_{BOOST}$ switching, may be present in LED drivers that sense the boost converter input voltage, $V_{IN}$, (or, when applied with an embodiment of the interface circuit, the converter output voltage +HT) in order to detect mains zero-crossings: In this case time t2 must occur (or preferably occurs) after the peak in voltage $V_{IN}$ otherwise the zero-crossing may be incorrectly sensed. An example implementation for regulating the voltage +HT is shown in the drawing for a boost converter on-time regulator (FIG. 8), which may be used as the controller in FIG. 5. The voltage may be controlled by regulating the duration the boost converter is running for (i.e. time t2−t1). Note the small time-delay blocks in FIG. 8. The boost voltage is preferably sampled just before the triac fires; the input voltage is preferably sampled just after the triac has fired. A delay may be about 100 μs for both of the delay blocks, the first delay being negative, the second being positive.

Additionally or alternatively the average switching current of $Q_{BOOST}$ may be controlled to ensure the desired target voltage difference at t4. This may, for example, be performed by pulse-width modulation (PWM) and/or pulse frequency modulation (PFM) of $Q_{BOOST}$ switching.

Sometime during the interval t1 to t2, the boost converter output voltage +HT will reach its peak value $V_{HTPK}$. Controlling the value of this peak voltage may serve to ensure that the desired target voltage difference is achieved at time t4. For example a higher peak voltage $V_{HTPK}$ may be required at smaller dimming angles to provide sufficient charge in $C_{BOOST}$ at time t2, such that both the target voltage difference requirement and the relatively high current demand from the output stage are met. The voltage rating of $C_{BOOST}$ may be a constraint in such circumstances, as capacitors with higher voltage ratings may be more costly and/or physically large.

It may be necessary to control one or more of (i) the duration of $Q_{BOOST}$ switching, (ii) the average switching current of $Q_{BOOST}$, and (iii) the peak +HT voltage, in order to satisfy the target voltage difference requirement across a wide range of dimming angles.

The preferred simultaneous constraints of (i) current drawn by the output stage at small dimming angles and (ii) the requirement for voltage +HT to drop to no less and no more than the target voltage difference below Vin when the triac fires may impose a maximum and a minimum capacitance respectively for $C_{BOOST}$. For some dimming angle and mains voltage combinations this may require a smaller capacitance $C_{BOOST}$ than is typical for PFC applications of a boost converter, in order for voltage +HT to fall quickly enough. An advantage of this is that $C_{BOOST}$ may be provided by a physically small, low-cost component(s), for example of a capacitor type other than electrolytic.

The optimum target voltage difference ($V_{INON}-V_{HTMIN}$) when the triac fires is not critical. It is advantageous that the diode $D_{SURGE}$ (FIG. 5) turns on for a considerable time, so that the boost capacitor $C_{BOOST}$ is part of the damping circuit; as soon as the $D_{SURGE}$ diode turns off, the boost capacitor is decoupled and no longer part of the damping circuit.

A series LCR circuit as found in this application, wherein the inductor may be part of the triac-dimmer (component L1, FIG. 1C) and the capacitor and/or resistor may be present in the dimmer interface circuit ($C_{IN}$, $C_{BOOST}$ and $R_{DAMP}$ in FIG. 5) of the solid state lighting device, may be damped by providing sufficient series resistance.

The preferred resistance for damping a series LCR circuit is proportional to the square root of L/C; a large capacitor may require a lower series resistor. The input capacitor Cin is only a very small capacitor, and may thus require a high value resistor for damping the ringing. Including Cboost in the resonant circuit may significantly increase the total capacitance in the LCR circuit and hence reduce the required series resistance. Note that a low series resistance is favourable as this series resistance may cause efficiency loss.

A large target voltage difference may ensure a longer time before the Dsurge turns off; hence a better damping but also a higher peak input current. A low target voltage difference may reduce the peak input current, but may decouple the boost capacitor from the resonant circuit before the energy in the LCR circuit is properly damped.

The optimal target voltage, or optimum target voltage difference ($V_{INON}-V_{HTMIN}$) when the triac fires, may depend on a number of variables, including, e.g.:

the mains voltage at time t1;
the capacitance of $C_{BOOST}$;
details of the triac and/or other dimmer components;
details of input circuit components of the LED driver;
the rated power of the LED driver; and/or
the value of the damping resistor $R_{DAMP}$.

However the efficacy of the clamping action of $C_{BOOST}$ on ringing due to triac firing events has not been found to be always greatly sensitive to these variables. For example a LED driver rated at 8 W provides good damping of a wide range of triac dimmers with a target voltage difference of 30 V to 80 V. The regulation loop may be designed to regulate to an exact voltage or to regulate the target voltage to fall within a range, e.g. 30-80V.

There may be some dimming angles for which it is not desirable to achieve the optimum target voltage difference ($V_{INON}$-$V_{HTMIN}$) when the triac fires. For example when the triac fires at very small and very large dimming angles, the instantaneous boost converter input voltage $V_{IN}$ may be as low as 50 V. Controlling the boost converter output voltage +HT to drop to, say, $V_{HTMIN}$=($V_{INON}$-50)=0 V may present an undesirably low input voltage to the output stage. This may be avoided by, for example, not setting the target voltage below a minimum value, for example around 50V. Alternatively or additionally, the output stage may reduce its power consumption when voltage +HT drops to or below a threshold value. This causes voltage +HT to drop relatively slowly, and/or more slowly, and may temporarily cause a reduction in the light output (but may in an embodiment provide a way to retain some energy in the boost capacitor $C_{BOOST}$). Once the triac fires again and voltage +HT rises above the same or a different threshold, the output stage returns to its normal mode.

The output stage may be used to control the boost converter output voltage +HT in other conditions: for example at large dimming angles (low light output) it may be difficult to ensure that $V_{HTMIN}$ is low enough to achieve the target voltage difference for proper damping. As noted above, it may not be necessary for the boost converter to switch at all, i.e. (t2-t1)→0, to ensure that voltage +HT falls sufficiently low by time t4. At very large dimming angles the output stage may still not consume sufficient current to reduce voltage +HT enough before the next time the triac fires, even with a small boost capacitor $C_{BOOST}$. In these circumstances it may be desirable to employ the output stage in a 'shunt mode', in which voltage +HT is reduced. In an embodiment voltage +HT is reduced by dissipating power in the output stage without noticeable effects on the light output.

For optimum compatibility with a wide range of dimmers it may be necessary to tailor the form of the average switching current of $Q_{BOOST}$ between times t1 and t2. As noted above, it is necessary to draw a minimum latch current and a minimum hold current through a triac in order to prevent it from turning off. This may be achieved by operating the boost converter at a relatively high average current immediately after the triac has fired, then reducing the average current once the triac has latched on. It is noted that the triac does not necessarily need to be turned on for the whole duration of the mains half cycle after it has first fired. It may only need to be on for as long as it takes to store sufficient charge in the boost capacitor $C_{BOOST}$, i.e. until time t2.

Triac latching is inherently strong using the above-described technique: the target voltage difference ($V_{INON}$-$V_{HTMIN}$) appears across diode $D_{SURGE}$ when the triac fires. This presents a very low impedance to current through the triac and the LED driver input circuit, until the boost capacitor $C_{BOOST}$ is charged up to the input voltage $V_{IN}$ (minus a small voltage drop across diode $D_{SURGE}$). However this very short duration clamping current may not itself ensure reliable triac latching for all triac types.

Following the clamping current transient, a relatively high average $Q_{BOOST}$ switching current may be provided in a variety of ways to ensure reliable triac latching. For a given size (inductance) of boost inductor $L_{BOOST}$ the highest average current may be provided by operating the boost converter in a continuous conduction mode (CCM). In such a mode the boost switch $Q_{BOOST}$ is closed in each cycle before the current through boost inductor $L_{BOOST}$ and boost diode $D_{BOOST}$ to boost capacitor $C_{BOOST}$ has decayed to zero. A period of such CCM operation immediately after the triac has fired may therefore provide optimum triac latching. This is particularly relevant to lower power LED drivers of, say, less than 15 W rated power, for which the required triac latching current of 100 mA or so represents a relatively large average current requirement. It is noted that the average $Q_{BOOST}$ switching current amplitude may, depending on the dimming angle, initially be limited due to the small voltage across the boost inductor $L_{BOOST}$, i.e. +HT-$V_{IN}$.

In order to minimise power dissipation, it may be preferable to reduce the average $Q_{BOOST}$ switching current once the triac has latched. This may also provide some flexibility in choosing a suitable combination of $Q_{BOOST}$ switching duration, average $Q_{BOOST}$ switching current, and peak +HT voltage, noted above. The boost converter may be operated in a discontinuous mode, or any other mode that provides the required triac hold current of 40 mA or so.

In the above embodiment, the boost converter output voltage is preferably regulated to obtain a desired voltage difference between the brightness control signal and the output voltage of the converter at the moment of firing of the triac. As the boost voltage is regulated to be less than the input mains voltage when the triac fires (time=t1), any ringing on the input voltage is advantageously clamped by the boost capacitor.

Referring to FIGS. 6(a) and 6(b), an embodiment of the interface circuit may not receive any information from the dimmer circuit, other than the 'brightness control voltage' (ie. the solid line depicted in FIGS. 6(a) and 6(b)). At moment t1, it decides, preferably based on the measured voltage difference at that moment, how long the boost converter should operate for (the length of the interval t1 to t2) and it preferably determines the required boost input current. At moment t2, the boost converter is then turned off. In this embodiment, the boost voltage that will be achieved at moment t4 is not yet known. Only at moment t4, the interface circuit knows whether it has achieved the desired voltage difference. If necessary, the interface circuit then makes adjustments to the boost duration and/or to the boost current in an effort to achieve a better result in the next cycle.

In one example, the brightness control voltage VIN from a dimmer (optionally via, e.g., a resistor, filter, rectifier and/or capacitor) has a transition at a time t1 (the transition generally corresponding to a triac firing and preferably for turning the controlled light source, e.g., LED on), and then may generally follow the remainder of the mains ac voltage half cycle as provided to the dimmer until reaching zero at t3. The converter output voltage +HT is advantageously boosted relative to the brightness control voltage VIN. The degree of boosting may depend on how long the converter operates to boost the output voltage, e.g., how long a converter switch Qboost operates. This may correspond to time t1 to t2. The duration t1-t2 may determine the level of the converter output voltage +HT at the next transition of brightness control voltage VIN. Preferably, control circuitry (e.g., the controller of FIG. 5) determines each such duration such that the difference between brightness control voltage and converter output voltage at the time of the next transition (t4) is closer to the target difference, e.g., 50V. Thus, an embodiment may ensure that the converter output voltage does not fall below a desired level during repeated dimming cycles. The converter output voltage +HT, generally corresponding to a voltage on an output capacitor Cboost of the converter may then be considered to be regulated. When the load on the interface circuit comprises a switched mode power supply (SMPS—e.g., flyback or and/or buck converter) driving an LED(s), ringing in the brightness control voltage due to resonance of reactive components of the SMPS and/or reactive components of the dimmer when the transition in brightness control voltage VIN occurs may be reduced or prevented by the clamping action of the brightness control voltage to the converter output voltage +HT. Where the resonance involves reactive components of the dimmer, reducing or preventing such ringing may prevent unwanted turn off of the triac. Such effects may mean that LED control can be improved, e.g., resulting in reduced flicker and/or longer lifetime of the SMPS and/or LED.

Such an embodiment will advantageously operate where; (i) the triac does not allow to turn the boost converter back on in the same cycle after it has been turned off; and/or (ii) during the interval t3 to t4, no energy is available from the mains.

To implement an embodiment as described a number of signals may need to be sensed by the controller. As noted above in reference to FIG. 5 the controller is able to sense or estimate both the boost converter output voltage, +HT, and the boost converter input voltage, $V_{IN}$. Direct connections to appropriate locations on the circuit may be made from the controller, for example via resistors to scale the voltages and/or currents of the controller input signals to suitably low values. However to minimise the cost of the controller it should preferably comprise the minimum number of pins (i.e. connections to the circuit). Thus measurement of some signals may be most economically made either indirectly and/or by using a pin that performs another function. The embodiment of FIG. 7 below illustrates some examples of this approach by providing a controller in an 8-pin IC package.

The example input circuit of this embodiment comprises filter inductor $L_{FILT}$ in parallel with input resistor $R_{IN}$, diodes $D_1$, $D_2$, $D_3$ and $D_4$ connected to form a bridge rectifier, input diode $D_{IN}$ decouples the voltage on input capacitor $C_{IN}$ from the input voltage. This allows input voltage measurement through $R_{HT}$ (when the boost converter is not running). Many other input circuits are applicable to this embodiment, that in FIG. 7 being merely an example. Additional to the components described in reference to FIG. 5 include the following:

$L_{FBB}$ is an auxiliary or feedback winding on the boost inductor $L_{BOOST}$, allowing the Controller to sense the voltage across $L_{BOOST}$ at pin FBB, preferably via resistive divider $R_{FBB1}$ and $R_{FBB2}$. This boost inductor feedback signal allows boost inductor demagnetisation detection and/or boost converter input voltage sensing.

Boost switch $Q_{BOOST}$ is embodied as an emitter-switched bipolar junction transistor (BJT), the emitter switch preferably being internal to the Controller and coupled for example between pins ED and GND.

Resistor $R_{HT}$, connected between the mains input and the base terminal of the BJT, allows rapid start-up of the Controller. Thus, the embodiment may comprise bootstrap circuitry. Advantageously resistor $R_{HT}$ may also provide a mains input voltage, i.e. $V_{IN}$, sensing signal to the Controller pin BD, from which information may be extracted, when the BJT base terminal is not being driven from pin BD. In particular this mains input voltage sensing signal is preferably used as described above to measure the instantaneous mains voltage between times t2 and t3, i.e. after the dimmer triac has fired. A dedicated pin for sensing the mains input voltage is therefore not required to implement an embodiment of the triac damping scheme described above. Resistor $R_{HT}$ may have a resistance between 1 MΩ and 50 MΩ; a lower resistance may allow the Controller to start-up more rapidly but may also increase power dissipation. Note that lower resistor values also simplify the measurement of the input mains voltage.

More generally regarding provision of bootstrap circuitry in an embodiment, we note that such circuitry may implement a method of bootstrapping a switch mode power converter (SMPC), the SMPC having: an input to receive power for said power converter; an internal power supply derived from said power received at said input; an output to provide a DC output voltage; a power switch; a controller to control said power switch, said controller having a threshold operating voltage; a transformer having a primary winding and a secondary winding coupled between said input and said output; said secondary winding being coupled to provide power for said DC output; said primary winding being coupled in series with said power switch and coupled to receive power derived from said input; an auxiliary power supply configured to provide a power supply to said controller; the SMPC further comprising a controller power supply capacitor to store charge derived from said auxiliary power supply during operation of said SMPC for providing said power supply to said controller, the method comprising: bleeding current from said internal power supply into the input of a current amplifier; and charging said controller power supply capacitor from a current output of said current amplifier via a passive circuit such that when a voltage of charge on said controller power supply capacitor derived from said auxiliary power supply is less than said threshold operating voltage said power supply to said controller is provided by said charging of said controller power supply capacitor from said current output of said current amplifier and wherein said passive circuit substantially inhibits current flow off said controller power supply capacitor towards ground. The auxiliary power supply may comprise an auxiliary winding of the transformer. For example, the above providing of the power supply to said controller by said charging of said controller power supply capacitor from said current output of said current amplifier may occur when the auxiliary power supply is off or at least not fully in operation, e.g., when the voltage on/current from the auxiliary power supply is zero.

Described similarly, an embodiment may comprise bootstrap circuit for a switch mode power supply, the switch mode power supply for converting a voltage of an input power rail, the switch mode power supply comprising: a transformer having a primary winding coupled to receive power derived from said input power rail; an auxiliary power supply; an internal power supply; a bipolar power switch; a controller having a supply input and a control switch connected in series with the emitter of the bipolar power switch; a reservoir capacitor configured to receive current from the auxiliary power supply and to determine voltage on the supply input of the controller, the bootstrap circuit comprising: a current bleed impedance to bleed current from the internal power supply; circuitry to deliver current from the internal power supply via the current bleed impedance to the base of the power switch such that the power switch is operable to amplify the current delivered from the internal power supply; a passive circuit to provide the amplified current to the reservoir capacitor; and the passive circuit further to substantially block reverse current flow from the supply input to the emitter of the power switch.

Advantages for using a bootstrap technique in this product may include any one or more of the following:
  a. a short start-up time is advantageous for a lighting product, but would normally require a relatively low value start-up resistor, or another means to start the converter, like an active switch;
  b. using the same input for quickly starting the converter with low power loss and for sensing the input voltage in some of the interval t0 . . . t3. (Sensing the input voltage may only work when the converter is off. That is during interval t2 to t3). Together with a means to measure input voltage during the other sections of the interval t0 . . . t3, this may thus save a dedicated Vin measurement pin on the control IC.
  4.3 preferably the power consumed by the interface circuit (=power drawn from the dimmer) during the interval t2 . . . t3 is low. The bootstrap technique may allow this, as the Rht resistor can be a high-value resistor. Therefore, the sensing and the start up may be combined with a single resistor; this may otherwise require two resistors. This one resistor may be saved.

Figure 7:
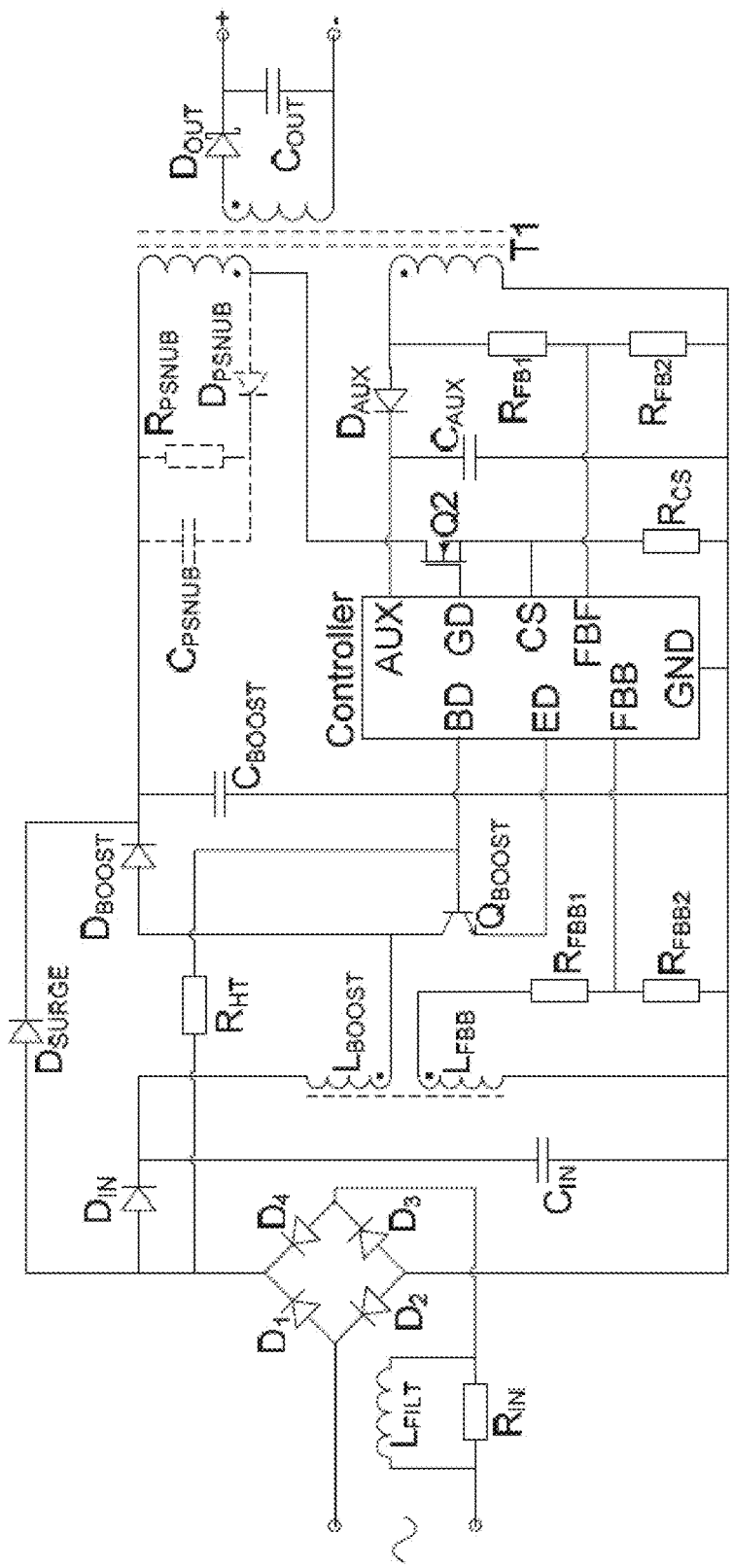
FIG. 7 shows an embodiment comprising a controller in an 8-pin IC package.

The output stage of the embodiment in FIG. 7 is shown as a flyback converter. This preferably comprises MOSFET switch Q2 and current sense resistor $R_{CS}$, transformer T1 featuring primary, auxiliary and output windings, auxiliary and output circuits, and an optional primary winding snubber circuit. The auxiliary circuit provides a feedback signal to Controller pin FBF, via resistor divider $R_{FB1}$ and $R_{FB2}$. This feedback signal may be used to provide primary side sensing of the flyback converter output voltage when flyback switch Q2 is open. See our U.S. patent application Ser. Nos. 11/445,473, 12/405,618 and/or 12/752,611 for example. (Additionally or alternatively, the feedback signal may be used to provide primary side sensing of the flyback converter output voltage and/or primary side estimation of output current by sensing the FBF waveform during the different stages of the flyback switching cycles. It is noted in this regard that it may be advantageous to sense both output voltage and current, as LEDs are generally driven using a regulated constant current). (Primary side sensing for an solid state lighting product may provide advantages such as low component count, cost reduction, smaller size and/or higher reliability. At least similar functionality may however be achieved with a secondary-side feedback flyback controller). Advantageously the feedback signal may also provide a boost converter output voltage, i.e. +HT, sensing signal to the FBF pin of the Controller when the flyback switch Q2 is closed. This may employ the transformer T1 which, when switch Q2 is closed and current flows through the primary winding to Gnd via $R_{CS}$, induces across the auxiliary winding a voltage that is proportional to the voltage across the primary winding, i.e. proportional to +HT. A dedicated pin for sensing the boost converter output voltage is therefore not required to implement an embodiment of the triac damping scheme described above.

Boost converter control may be aided by the use of a boost switch current sense signal. This may be performed, for example, by sensing the voltage across a resistance in the conduction path switch $Q_{BOOST}$ whilst it is closed. Although not shown in FIG. 7, such a current sensing arrangement may be present inside the package of an IC Controller, between the ED and GND pins, which does not add to the pin count of the IC Controller nor to the component count of the application circuit.

The above-described embodiment of FIG. 7 uses an IC Controller with a small number of pins. However because the sensing capabilities are minimised to achieve this, some aspects of control may need to be specially adapted. For example it may be desirable to maintain the average $Q_{BOOST}$ switching current approximately constant across a range of mains input voltages, e.g. 185 V to 264 V, or 85 V to 132 V. This may ensure optimal triac latching and holding behaviour for the widest range of dimmers over a specified range of mains voltages. Such control may ideally employ sensing of the current through the boost inductor $L_{BOOST}$ after the boost switch $Q_{BOOST}$ has been opened. In the 8-pin embodiment currently envisaged this sensing may not be conveniently available, so a feed-forward technique may be used instead.

In view of the above, any embodiment may have any one or more of, inter alia, the following advantages:
  low dissipation (e.g., little resistance or shunting used in damping);
  efficient (e.g., damping energy is held in boost capacitor and consumed by output stage);
  low bill of materials (e.g., implemented in 8-pin IC, minimal application components count and/or cost);
  long life (e.g., no high voltage electrolytic capacitors used); and/or
  flexible (e.g., boost converter may run in high PFC or power factor mode(s) when dimming is not required).

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. Dimmer interface circuit for controlling brightness of a solid state light emission device, the interface circuit having an input to receive a brightness control voltage from a dimmer circuit and comprising:
  a voltage converter to provide a converter output voltage and having an inductive component and a charge store, the charge store controllably coupled to receive charge from the inductive component to thereby convert the brightness control voltage to the converter output voltage; and
  control circuitry, comprising:
    a comparison circuit to compare an instantaneous brightness control voltage and the converter output voltage; and
    a transition detector to detect first and second transitions of the brightness control voltage, said first and second transitions causing the solid state light emission device to transition from off to on, wherein the first transition occurs in a first cycle of the brightness control voltage, and wherein the second transition occurs in a second, later cycle of the brightness control voltage,
  wherein the control circuitry is configured to reduce ringing on a drive signal to the solid state light emission device by controlling the voltage converter dependent on comparisons by the comparison circuit of the instantaneous brightness control voltage and the converter output voltage at times of the first and second transitions of the brightness control voltage, such that a second difference between the instantaneous brightness control voltage and the converter output voltage at the time of the second transition is closer to a target voltage difference than a first difference between the instantaneous brightness control voltage and the converter output voltage at the time of the first transition, wherein the target voltage difference is non-zero and the converter output voltage is less than the instantaneous brightness control voltage at the time of the second transition.

2. Dimmer interface circuit of claim 1, comprising voltage clamp circuitry to clamp the brightness control voltage relative to the converter output voltage and to conduct current to the charge store which is received from the input to receive the brightness control voltage.

3. Dimmer interface circuit of claim 1, wherein the comparison circuit is configured to indicate the first difference between the instantaneous brightness control voltage and the converter output voltage at the time of the first transition, and the control circuitry is configured to perform the converter control dependent on the indicated first difference.

4. Dimmer interface circuit of claim 1, the control circuitry configured to control an amount of charge delivered to the charge store from the inductive component during a said cycle of the brightness control voltage, to thereby perform said converter output voltage control.

5. Dimmer interface circuit of claim 4, comprising a switch to provide said controllable coupling, the control circuitry configured to control at least one switching cycle of the switch to thereby control the amount of charge delivered to the charge store.

6. Dimmer interface circuit of claim 5, wherein the control circuit is configured to control a plurality of switching cycles of the switch to control an average current received by the charge store from the inductive component, to thereby control said amount of charge.

7. Dimmer interface circuit of claim 4, wherein the transition detector is configured to trigger the charge delivery to the charge store.

8. Dimmer interface circuit of claim 4, configured to control a duration of the charge delivery, to thereby control the amount of charge delivered to the charge store.

9. Dimmer interface circuit of claim 8, comprising a timing circuit configured to end the charge delivery when the duration elapses, the timing circuit configured to indicate a zero crossing of a mains voltage based on the brightness control voltage and to time the duration from said zero crossing indication.

10. Dimmer interface circuit of claim 4, configured to control the charge delivery such that a duration of the charge delivery extends through a peak of the brightness control voltage.

11. Dimmer interface circuit of claim 4, configured to deliver a first average current followed a second lower average current to the charge store to thereby deliver the amount of charge.

12. Dimmer interface circuit of claim 1, configured to control a peak voltage of the converter output voltage to thereby perform said converter output voltage control.

13. Dimmer interface circuit of claim 1, wherein the charge store comprises a non-electrolytic capacitor.

14. Dimmer interface circuit of claim 1, comprising a voltage indicator circuit to indicate a value of a mains voltage at the time of the first transition, the control circuitry configured to vary the target voltage difference based on the indicated value of the mains voltage.

15. A solid state lighting device driver comprising a dimmer circuit and a dimmer interface circuit of claim 1, the dimmer circuit comprising a triac and operable to control a phase angle of switching of the triac to thereby output the brightness control voltage.

16. A solid state lighting device driver comprising:
a dimmer interface circuit coupled to receive a brightness control voltage and provide a converter output voltage, wherein the dimmer interface circuit comprises:
an inductive component coupled to receive the brightness control voltage;
a charge store which is controllably coupled to the inductive component;
a switch coupled to the charge store, wherein the switch controls the coupling of the charge store to the inductive component such that the charge store receives charge from the inductive component to convert the brightness control voltage to the converter output voltage; and
a control circuit coupled to control the switching of the switch to reduce ringing on a drive signal to a solid state light emission device, wherein the control circuit controls the switch in response to a comparison indicating a first difference between an instantaneous brightness control voltage and the converter output voltage at a first transition in a first cycle of the brightness control voltage causing the solid state light emission device to transition from off to on such that a second difference between the instantaneous brightness control voltage and the converter output voltage at a second transition in a second, later cycle of the brightness control voltage causing the solid state light emission device to transition from off to on is closer to a target voltage difference than the first difference at the first transition, wherein the target voltage difference is non-zero and the converter output voltage is less than the instantaneous brightness control voltage at the second transition in the second, later cycle of the brightness control voltage; and
an output stage for driving the solid state light emission device, the dimmer interface circuit coupled to provide the converter output voltage to the output stage, the output stage having a power controller configured to reduce a power consumption of the output stage in response to the converter output voltage falling below a threshold voltage.

17. A solid state lighting device driver, comprising:
a dimmer interface circuit coupled to receive a brightness control voltage and provide a converter output voltage, wherein the dimmer interface circuit comprises:
an inductive component coupled to receive the brightness control voltage;
a charge store which is controllably coupled to the inductive component;
a switch coupled to the charge store, wherein the switch controls the coupling of the charge store to the inductive component such that the charge store receives charge from the inductive component to convert the brightness control voltage to the converter output voltage; and a control circuit coupled to control the switching of the switch to reduce ringing on a drive signal to a solid state light emission device, wherein the control circuit controls the switch in response to a comparison indicating a first difference between an instantaneous brightness control voltage and the converter output voltage at a first transition in a first cycle of the brightness control voltage causing the solid state light emission device to transition from off to on such that a second difference between the instantaneous brightness control voltage and the converter output voltage at a second transition in a second, later cycle of the brightness control voltage causing the solid state light emission device to transition from off to on is closer to a target voltage difference than the first difference at the transition, wherein the target voltage difference is non-zero and the converter output voltage is less than the instantaneous brightness control voltage at the second transition in the second, later cycle of the brightness control voltage; and an output stage for driving the solid state light emission device, the dimmer interface circuit coupled to provide the converter output voltage to the output stage, the output stage configured to shunt charge from the charge store dependent on a dimming angle indicated by the brightness control voltage, the shunting to reduce the converter output voltage.

18. A method for reducing ringing on a drive signal to a solid state lighting device, the method comprising:

controlling a phase angle of switching of a triac of an AC dimmer circuit to thereby provide a brightness control voltage for determining brightness of the lighting device;

detecting a first transition of the brightness control voltage in a first cycle of the brightness control voltage, wherein transitions of the brightness control voltage cause the solid state light emission device to transition from off to on;

comparing an instantaneous brightness control voltage and a converter output voltage, the instantaneous brightness control voltage and the converter output voltage having levels at a time of the first transition of the brightness control voltage;

regulating a boost converter output voltage such that a second difference between the instantaneous brightness control voltage and converter output voltage at a time of a second transition occurring during a second, later cycle of the brightness control voltage is closer to a target voltage difference than a first difference between the instantaneous brightness control voltage and converter output voltage at a time of the first transition, wherein the target voltage difference is non-zero and the converter output voltage is less than the instantaneous brightness control voltage at the time of the second transition; and using the converter output signal to drive the lighting device.

19. The method of claim 18, comprising determining the target voltage difference on the basis of at least one of:
an indication of a mains voltage at the time of the second transition;
a capacitance value of the charge store;
a rated power of an LED driver coupled to an output of the boost converter.

20. The method of claim 18, wherein the target voltage difference is between 30V and 80V, preferably at least 50V.

21. Dimmer interface circuit for controlling brightness of a solid state light emission device, the interface circuit having an input to receive a brightness control voltage from a dimmer circuit and comprising:

a voltage converter to provide a converter output voltage and having an inductive component and a charge store, the charge store controllably coupled to receive charge from the inductive component to thereby convert the brightness control voltage to the converter output voltage, wherein the voltage converter further comprises:
a clamp circuit which is coupled to allow current to bypass the inductive component when the brightness control voltage is greater than the converter output voltage, wherein the clamp circuit couples and decouples the charge store as part of a damping circuit; and control circuitry, comprising:
a comparison circuit to compare an instantaneous brightness control voltage the converter output voltage; and
a transition detector to detect first and second transitions of the brightness control voltage, said first and second transitions causing the solid state light emission device to transition from off to on, wherein the first transition occurs in a first cycle of the brightness control voltage, and wherein the second transition occurs in a second, later cycle of the brightness control voltage, wherein the control circuitry is configured to reduce ringing on a drive signal to the solid state light emission device by controlling the voltage converter dependent on comparisons by the comparison circuit of the instantaneous brightness control voltage and the converter output voltage at times of the first and second transitions of the brightness control voltage, wherein a second difference between the instantaneous brightness control voltage and the converter output voltage at the time of the second transition is closer to a target voltage difference than a first difference between the instantaneous brightness control voltage and the converter output voltage at the time of the first transition, wherein the target voltage difference is non-zero and the converter output voltage is less than the instantaneous brightness control voltage at the time of the second transition.

* * * * *